United States Patent Office 3,772,340
Patented Nov. 13, 1973

3,772,340
BIS(COUMARINYL)PHOSPHATES
Nagesh Shamrao Mhatre and Robert Charles Boguslaski, Elkhart, Ind., assignors to Miles Laboratories, Inc., Elkhart, Ind.
No Drawing. Original application July 13, 1970, Ser. No. 54,630, now abandoned. Divided and this application May 2, 1972, Ser. No. 249,735
Int. Cl. C07d 7/26
U.S. Cl. 260—343.2 P         8 Claims

ABSTRACT OF THE DISCLOSURE

A novel test system for determining the number and type of bacteria present in fluids such as infected urine is disclosed as well as certain new organic phosphates which may be utilized in such a test. The test is specific, rapid and accurate and eliminates the necessity of the culturing techniques employed in the past.

---

This is a division of application Ser. No. 54,630, filed July 13, 1970, now abandoned.

BACKGROUND OF THE INVENTION

(A) Field of the invention

Asymptomatic bacteriuria is a significant medical problem in which a bacterial count of 100,000 cells per milliliter of urine is considered the borderline between a normal and infected condition. Present methods for enumeration of bacteria in urine depend upon bacterial reduction of triphenyl tetrazolium chloride or nitrate, culturing techniques, microscopic examination, staining or other elaborate and expensive methods. Since all known methods are either time consuming, non-specific, unreliable or expensive, it became necessary to develop new approaches to this problem. Detection of bacterial contamination in other common aqueous fluids such as industrial cutting fluids, jet engine fuels, foods and so forth is also a continuing problem to industrial and health authorities.

(B) Description of the prior art

It is known that certain enzymes can be selectively released from bacteria by osmotic shock. For example, E. coli cells, suspended in a concentrated solution of sucrose to which is added some ethylenediamine tetracetate, can be suddenly shifted to a medium of low osmotic strength which causes the release of enzymes. It is also known that these released enzymes can be assayed colorimetrically.

SUMMARY OF THE INVENTION

The present invention provides a novel test for bacteria in fluids such as urine which is rapid and convenient but which obviates the necessity of culturing techniques. In such test, bacteria collected under aseptic conditions, are separated by centrifugation or by passage of the fluid through a millipore filter. The bacteria are then subjected to osmotic shock and the released enzymes are assayed to provide an index of cell density and type. In a preferred method of operation, the enzymes are assayed fluorometically employing novel fluorogenic diesters of phosphoric acid as substrates.

PREFERRED EMBODIMENTS OF THE INVENTION

It has now been found that constitutive enzymes released from bacterial cells present in infected or contaminated fluids such as urine can be used as a measure of the density and type of such cells. In the case of urine, the test can be used as a measure of the degree and type of bacterial infection and indirectly as an aid in determining the physiological condition of the individual passing the urine.

The particular enzyme being used as a measure of the degree and type of bacterial contamination can be any of those which are released from the cell upon subjecting the cell to an internal stress. For example, the following enzymes have been found to be released from bacteria: alkaline phosphatase, ribonuclease, deoxyribonuclease, acid hexose phosphatase, 5'-nucleotidase and the like.

These enzymes may be released by any of the methods commonly used to accomplish this end. Particular methods which may be mentioned are osmotic shock and spheroplast formation. In one method, one gram of E. coli cells are first subjected to osmotic shock by suspending them in 80 ml. of 20% sucrose and 0.03 molar tris (hydroxymethyl) aminomethane hydrochloric acid medium at a pH of 8 and a temperature of 24° C. The resulting suspension is treated with sufficient disodium ethylenediamine tetracetate to result in 0.001 M concentration thereof and mixed on a rotary shaker for 10 minutes. The mixture is centrifuged for 10 minutes in a cold room and the supernatant removed. The solid pellet remaining is mixed with cold water and shaken in an ice bath for 10 minutes after which the suspension is centrifuged and the supernatant removed to provide shock fluid containing the phosphodiesterases thus released.

In another method of selective enzyme release, gram negative bacterial cells may be converted to spheroplasts by treatment with a combination of lysozyme and ethylenediamine tetra-acetate.

The enzymes released may be assayed by any of those methods known in the art of analytical chemistry providing that the method is sufficiently sensitive to detect the specific enzyme released. These methods include colorimetric, fluorimetric, radiochemical tracer methods, spectrophotometric and the like. In this regard certain of the prior art colorimetric methods are not sufficiently sensitive to detect the small amount of enzyme released and it has been found that a superior fluorimetric assay method may be used to detect certain phosphodiesterases present in E. coli, a common microorganism found in contaminated fluids. It has also been found that these diesterases are constitutive and are selectively released from E. coli. A constitutive enzyme is one found in identical amounts in bacteria which have been grown under a variety of conditions.

The following examples relate to a novel fluorimetric assay for such diesterases, but it is not intended that the invention be limited thereto.

EXAMPLE 1

A portion of the shock fluid from E. coli cells prepared by the method described hereinabove was diluted with water in one to ten steps to a 1 to 100,000 dilution. The resulting solutions were assayed fluorometrically employing bis-(7-coumarinyl) phosphate or bis-(4 - methyl - 7-coumarinyl) phosphate as substrates. Thus, a mixture of one milliliter of each dilution and an equal volume of a 0.005 molar aqueous solution of each phosphate buffered to a pH of 6.7 was incubated for 20 minutes at 37° C. and then treated with one milliliter of 0.1 normal aqueous sodium hydroxide solution. The fluorescence of the mixture was determined on a fluorimeter at an excitation wave length of 365 millimicrons and an emission wavelength of 450 millimicrons. The assay using either substrate was sensitive enough to detect the quantity of enzyme that would be present in $2 \times 10^5$ bacteria per milliliter of lysed solution.

The compounds employed as substrates in the foregoing assay were prepared as shown in the following examples.

EXAMPLE 2

Preparation of bis-(7-coumarinyl) phosphate

To a slurry of 3.24 grams (0.02 mole) of 7-hydroxy-coumarin (melting at 240° C.) in 50 milliliters of benzene heated at the reflux temperature was added with vigorous stirring 1.53 grams (0.01 mole) of phosphorous oxychloride. Thereafter, 1.6 grams (0.02 mole) of pyridine in 5 milliliters of benzene was added dropwise over a 15 minute period. The reaction mixture was heated for 2 hours and allowed to stand overnight. The solid that formed was separated and refluxed for 4 hours in a mixture of 100 milliliters of water and 150 milliliters of acetone. The resulting solution was evaporated and the oil residue dissolved in a 10% aqueous solution of sodium bicarbonate which was extracted thrice with ethyl acetate. The water layer was then treated with dilute aqueous hydrochloric acid to form a white solid. This solid was digested in acetone, then benzene, dissolved in water and reprecipitated with concentrated hydrochloric acid to yield 1.2 grams of bis-(7-coumarinyl) phosphate melting at 238° C. The carbon content found for $C_{18}H_{11}PO_8$ was 55.61% compared to the calculated value of 55.97% carbon whereas the hydrogen content was 2.87% which agreed with the theoretical value.

EXAMPLE 3

Preparation of bis-(4-methyl-7-coumarinyl) phosphate

A mixture of 7.08 grams (0.04 mole) of 4-methyl-7-hydroxy-coumarin (melting point 185° C.) and 3.06 grams (0.02 mole) of $POCl_3$ was heated at the reflux temperature with stirring and over a period of 30 minutes a solution of 3.16 grams (0.04 mole) of dry pyridine in 5 milliliters of benzene was added. Heating was continued for 2 hours and the mixture was allowed to stand at room temperature for 2 days. The oil and benzene layers were then separated and the benzene solution evaporated in vacuo. The residue was treated with acetone and filtered. To the acetone filtrate was added an equal volume of water and the aqueous mixture thereafter heated to precipitate the desired bis-(4-methyl-7-coumarinyl) phosphate as a white solid which after repeated recrystallization from water melted at 235° C. Analysis for $C_{20}H_{15}PO_8$ was 57.97% carbon and 3.65% hydrogen calculated compared to the actual values of 57.82% carbon and 3.68% hydrogen.

In like manner, the reaction of one molecular proportion of $POCl_3$ with two molecular proportions of 4-ethyl-7-hydroxycoumarin (M.P.=177° C.), 4-n-propyl-7-hydroxycoumarin (M.P.=136° C.), 4-n-butyl-7-hydroxycoumarin (M.P.=140° C.), 4-isobutyl-7-hydroxycoumarin (M.P.=117° C.) or 4-n-amyl-7-hydroxycoumarin (M.P.=146° C.) will produce the corresponding bis-(4-ethyl-7-coumarinyl) phosphate (molecular weight=428), bis-(4-n-propyl-7-coumarinyl) phosphate (molecular weight=442), bis-(4-n-butyl-7-coumarinyl) phosphate or bis-(4-isobutyl-7-coumarinyl) phosphate (molecular weight=456) and bis-(4-n-amyl-7-coumarinyl) phosphate (molecular weight=470), respectively.

The novel fluorogenic diesters of phosphoric acid employed as substrates in the bacteriuria test of this invention have the formula

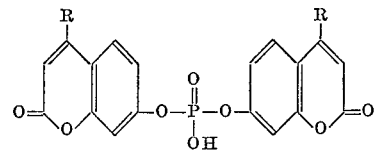

wherein each R is hydrogen or lower alkyl containing from 1 to 5 carbon atoms.

What is claimed is:

1. A compound of the formula:

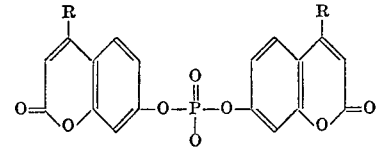

wherein each R is hydrogen or loweralkyl containing from 1 to 5 carbon atoms.

2. A compound as in claim 1 wherein each R is hydrogen.
3. A compound as in claim 1 wherein each R is methyl.
4. A compound as in claim 1 wherein each R is ethyl.
5. A compound as in claim 1 wherein each R is n-propyl.
6. A compound as in claim 1 wherein each R is n-butyl.
7. A compound as in claim 1 wherein each R is isobutyl.
8. A compound as in claim 1 wherein each R is n-amyl.

References Cited
UNITED STATES PATENTS 3,064,009   11/1962   Rigterink _____ 260—343.2

JOHN M. FORD, Primary Examiner

U.S. Cl. X.R.

424—279